Figure 1:
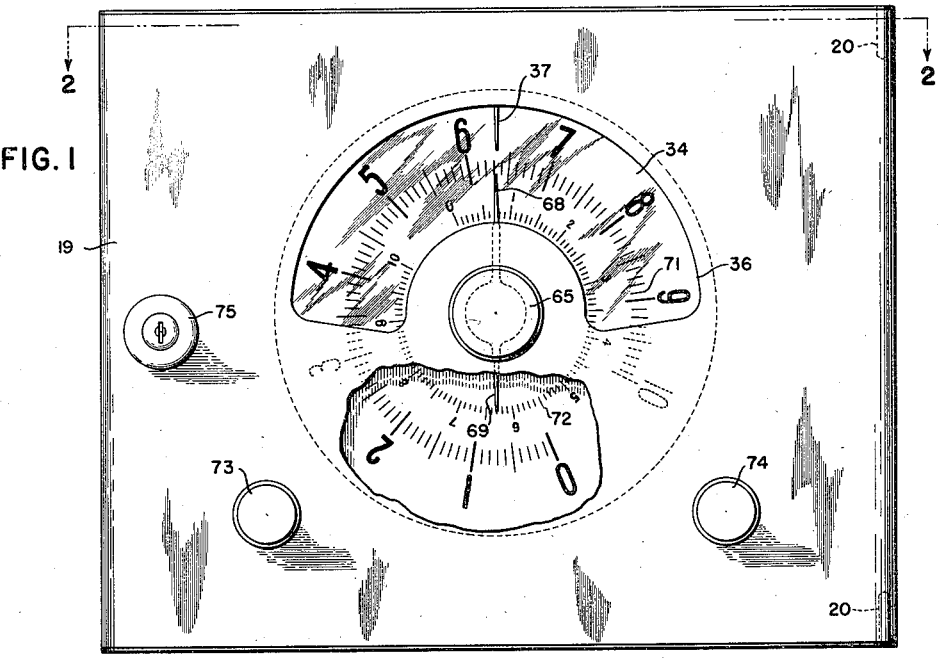

March 13, 1951 — A. A. NINA — 2,545,373
SELF-BALANCING POTENTIOMETER CIRCUIT
HAVING ILLUMINATED INDICATING DIAL
Filed May 2, 1945 — 3 Sheets-Sheet 1

INVENTOR.
ANTHONY A. NINA
BY C B Spangenberg
ATTORNEY.

March 13, 1951  A. A. NINA  2,545,373
SELF-BALANCING POTENTIOMETER CIRCUIT
HAVING ILLUMINATED INDICATING DIAL Filed May 2, 1945  3 Sheets-Sheet 2

*INVENTOR.*
ANTHONY A. NINA
BY
*C. B. Hargenberg*
ATTORNEY.

March 13, 1951     A. A. NINA     2,545,373
SELF-BALANCING POTENTIOMETER CIRCUIT
HAVING ILLUMINATED INDICATING DIAL Filed May 2, 1945     3 Sheets-Sheet 3

*INVENTOR.*
ANTHONY A. NINA

BY *C. B. Spangenberg*
ATTORNEY.

Patented Mar. 13, 1951

2,545,373

UNITED STATES PATENT OFFICE 2,545,373

SELF-BALANCING POTENTIOMETER CIRCUIT HAVING ILLUMINATED INDICATING DIAL

Anthony A. Nina, Philadelphia, Pa., assignor, by mesne assignments, to Minneapolis-Honeywell Regulator Company, Minneapolis, Minn., a corporation of Delaware Application May 2, 1945, Serial No. 591,490

22 Claims. (Cl. 236—69)

The present invention relates to control instruments, and, more particularly, to a small, compact control instrument of the self-balancing potentiometer type. The real value of self-balancing potentiometers lies in their extreme accuracy and reliability as well as in the fact that they have a large amount of power available to operate various control devices. All of the self-balancing instruments with which I am familiar are large and are expensive to manufacture. These characteristics have to a large extent limited their use to relatively important installations that were capable of sustaining the expense of an instrument of this type. They are also used somewhat in processes where the surrounding physical conditions, such as a large amount of vibration, are such that other types of measuring and control instruments will not perform accurately.

It is an object of this invention to provide a self-balancing potentiometer that has all of the desirable characteristics of an instrument of this type and in addition is small in size and is relatively inexpensive to build. The instrument of this invention is provided with means to indicate the value of the condition being measured and the value at which it is desired to control the condition. The instrument is also provided with control devices by means of which the condition being measured may be controlled.

It is a further object of the invention to provide a novel structure by means of which the control instrument of the present invention may be adjusted to maintain the condition under control at various values. To this end there is provided a cam to actuate the control device which cam is rotated by the instrument as it is balancing itself. This cam may also be rotated independently relative to the remaining parts of the instrument to a position corresponding to the value at which it is desired to maintain the condition under control.

It is a further object of the invention to provide a compact and efficient arrangement of parts in a self-balancing control potentiometer. It is also an object to provide a novel indicating scale and pointer arrangement by means of which the present value and the desired value of the condition may always be determined no matter what they may be.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 2:
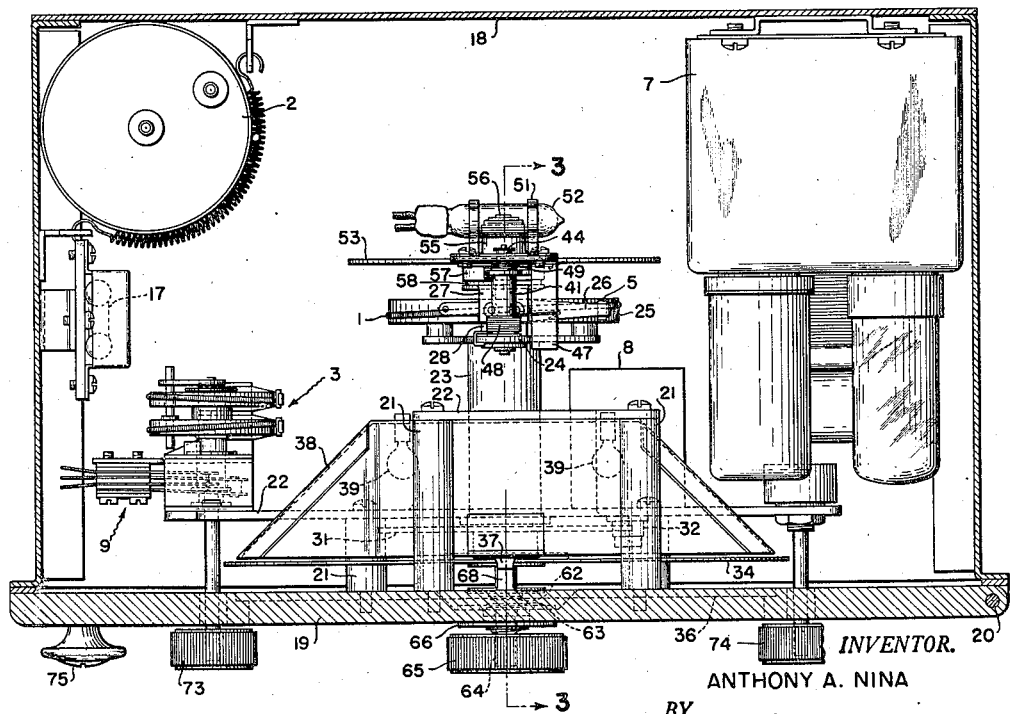
Figure 3:
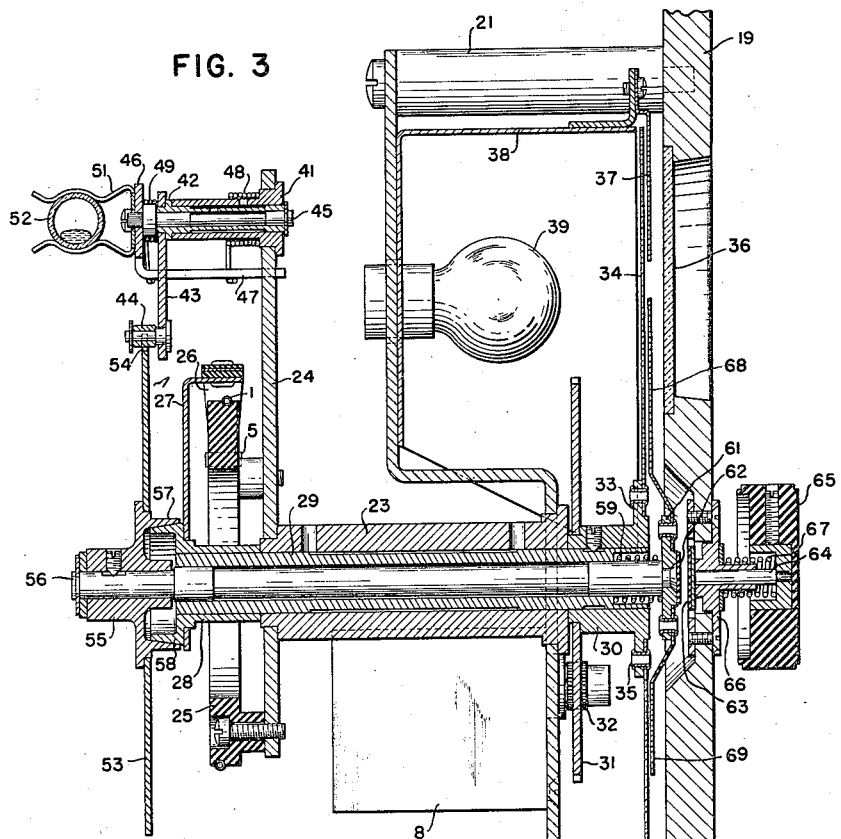
Figure 4:
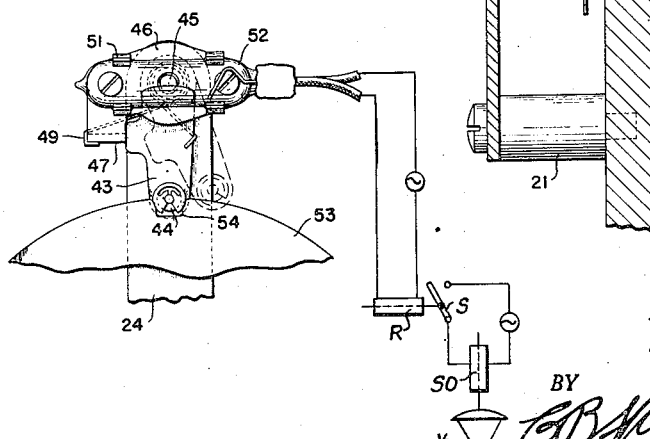
Figure 5:
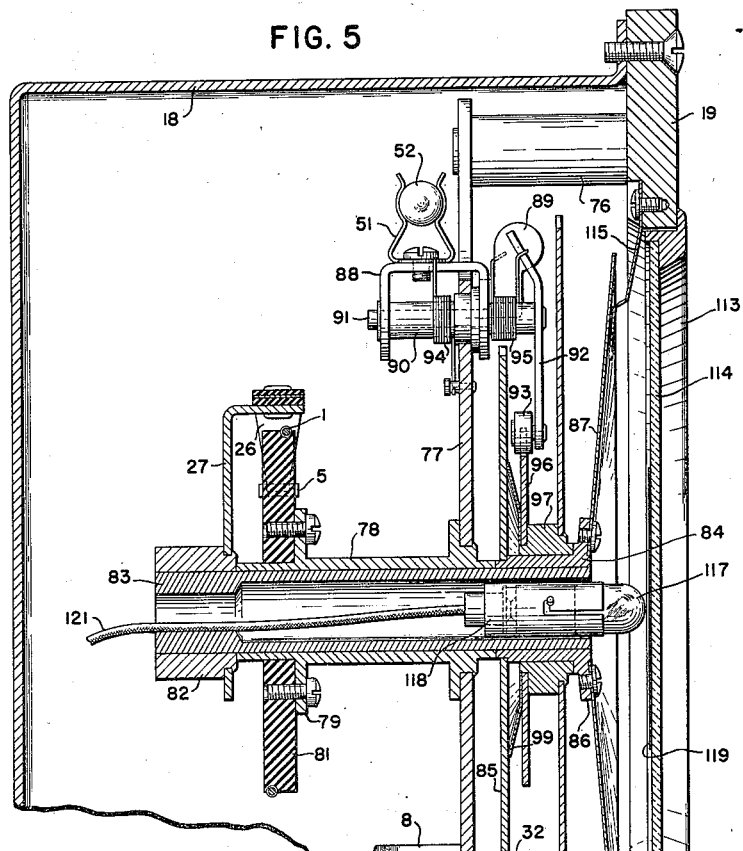
Figure 6:
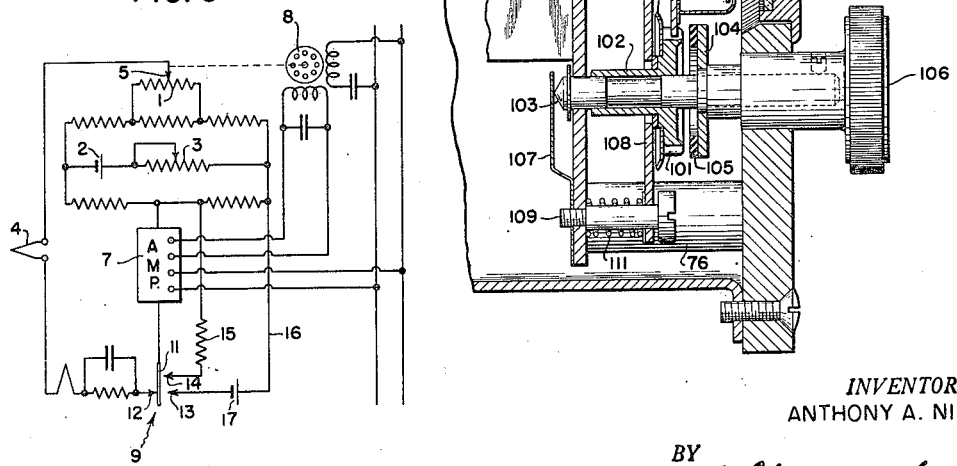

In the drawings:

Figure 1 is a front view of the instrument with a portion broken away to show better the scale, Figure 2 is a view partly in section taken on line 2—2 of Figure 1, Figure 3 is a sectional view taken on line 3—3 of Figure 2, Figure 4 is a view showing the control switch and its operating mechanism, Figure 5 is a sectional view of a different embodiment of the invention, and Figure 6 is a wiring diagram of a potentiometer circuit.

In Figure 6 there is shown a typical potentiometer circuit in which there is a slidewire 1 that has a potential impressed across it by a battery 2 to produce a predetermined voltage drop, the battery preferably being in the form of a dry cell. Connected in circuit with the battery is a variable resistance 3 that is used to maintain constant the potential drop in the circuit as the battery diminishes in power in order to maintain the system in calibration. The voltage from the thermocouple 4 is impressed across a portion of the slidewire 1 as determined by the position of the contact 5. As the thermocouple temperature changes, the E. M. F. produced thereby varies and the potentiometer becomes unbalanced. This in turn is detected by a vibrator and amplifier unit 7 to energize a motor 8 to shift the contact 5 along the slidewire in the proper direction and amount in order to rebalance the potentiometer circuit. The details of the vibrator and amplifier are disclosed in the copending application of Walter P. Wills, Ser. 421,173, which was filed on December 1, 1941, now Patent No. 2,423,540, dated July 8, 1947.

The thermocouple is normally connected in the circuit by means of a switch 9 which consists of a movable contact 11 that is directly connected to the amplifier and a stationary contact 12 that is connected to the thermocouple. This switch is also provided with a stationary contact 13 that is connected to the potentiometer network and a stationary contact 14 that is used to shunt a resistance 15 around the amplifier at such times as the circuit is standardized. In a wire 16 between the contact 13 and the potentiometer network, there is located a standard cell 17 which is used to impress a standard potential drop across a portion of the potentiometer network at such times as the network is being recalibrated or standardized.

In the operation of a potentiometer network of the type disclosed above, on the occurrence of a change in temperature of a thermocouple 4, the potentiometer circuit will be unbalanced to produce a current flow in one direction or the other through a vibrator which is included along with the amplifier and designated at 7. The vibrator and amplifier will detect this unbalance, its direction and amount, and correspondingly energize the motor 8 for rotation in the proper direction. The motor is mechanically connected in a manner to be described with a contact 5 so that the latter is shifted along the slidewire 1 to a position in which the potentiometer circuit is again rebalanced and no current flows through the unit 7.

Due to the fact that the strength of the battery 2 gradually diminishes with use, it becomes necessary to adjust the resistance 3 from time to time in order to maintain the calibration of the instrument. At such times as the instrument is to be recalibrated or standardized, the movable contact 11 of switch 9 is shifted to the right to disconnect the thermocouple from the circuit and to insert the standard cell 17 across a portion thereof and to simultaneously insert the shunt resistance 15 around unit 7. The resistance 3 is then adjusted until the potential drop across the slidewire 1 is brought back to normal. The instrument is then recalibrated and will continue to function in its normal fashion.

Referring to Figures 1 to 4 inclusive, it will be seen that the various parts of the potentiometer are placed in a casing 18 that is provided with a door 19 which is hinged to the front of the casing by means of hinge pins 20. In the casing there is provided means to support the battery 2, the amplifier 7, and the standard cell 17, as well as various of the resistances. The remaining parts of the mechanism including the standardizing rheostat 3 and the switch 9 are mounted on the door 19 so that these parts may be moved to an accessible position when the door is opened.

As best seen in Figures 2 and 3 there are provided a plurality of studs 21 which extend rearwardly from the door 19 and which have attached to them a supporting plate 22. Mounted on the supporting plate and projecting rearwardly therefrom or to the left in Figure 3 is a hollow shaft or bearing 23 which has fastened to its rear end and extending upwardly therefrom a supporting arm 24. This arm has mounted upon it an annular member 25 made of insulating material around which is wrapped the slidewire 1 that takes the form of a helical coil of wire which is fastened to the periphery of the insulating support. It will be seen in Figure 2 that this slidewire extends at an angle to the axis of the support 25. The purpose of this is to produce a wiping or sliding engagement with contact 5 as the latter is rotated around the slidewire. This wiping action prevents a groove from being worn in the surface of the contact.

The contact 5 is mounted on the outer end of a spring supporting arm 26 which is attached to and insulated from an arm 27. This latter arm is mounted on a collar 28 which is attached to the rear end of a hollow shaft 29 that is journaled in the bearing 23. Fastened to the front end of shaft 29 is a second collar 30 that has a driving gear 31 mounted upon it. Gear 31 meshes with a pinion 32 on the shaft of the potentiometer motor 8 which is fastened to the rear of supporting plate 22, as best shown in Figures 2 and 3. The collar 30 is provided on its right end with a flange 33 that serves to support an indicating scale or dial 34. This dial is fastened to the flange by any suitable means which are shown herein as being rivets 35. Dial 34 is located behind a window 36 that is formed in the door 19 and cooperates with an index 37 to indicate the value of the temperature being measured. The index 37 is fastened to the front part of a housing 38 which is in turn attached to the plate 22. This housing serves as a reflector for a pair of small light bulbs 39 which may be illuminated so that the scale, which is preferably translucent, may be more easily read.

In the normal operation of the potentiometer any unbalance of the potentiometer circuit which is produced by change in the temperature to which the thermocouple 4 is subjected, will produce energization of the motor 8 in a manner previously described. Rotation of this motor will act through pinion 33 and gear 31 to move contact 5 around the slidewire 1 to a position at which the potentiometer circuit is again balanced. This same rotation of the contact 5 will cause a movement of dial 34 relative to the stationary index 37 so that the value of the temperature being measured may be indicated to an observer in the front of the instrument.

With instruments of this type it is often desired to control the temperature which is being measured or to control some other condition which affects the value of the temperature. This may be accomplished by the instrument of the present invention by operating a control switch as the contact 5 is moved relative to the slidewire. Accordingly, a means is provided in this instrument to mount such a switch and to operate that switch as the value of the temperature varies from some given, desired value. To this end a control switch supporting means is provided on the upper part of the supporting arm 24. A hollow bearing 41 projects rearwardly from that support. Rotatable in this bearing is a hollow shaft 42 to which is attached a downwardly extending arm 43 that has a roller 44 journaled on a pin projecting from its lower end. Journaled for rotation in the shaft 42 is a second shaft 45 that has a supporting plate 46 fastened to its rear end. This plate has a forwardly extending arm 47 that is adapted to bear against the side of arm 43 and supporting plate 24. There is provided a spring 48 which resiliently holds the arm 47 against the left side of the support 24 as shown in Figure 4, and there is provided a second spring 49 which holds a projection on the arm 43 against the arm 47 of plate 46. A switch supporting bracket 51 is fastened to the rear of plate 46 as is best shown in Figure 3, and this member supports in it a conventional mercury switch 52.

The switch is tilted to be opened and closed by means of a cam 53 that has a cutout portion or notch 54 which cooperates with the roller 44 to operate the switch. This cam is mounted on a sleeve 55 that is attached to the rear end of a shaft 56 which is journaled in the hollow shaft 29. Sleeve 55 has its right end formed as the driven member 57 of a cone type clutch and is normally held in engagement with the driving member 58 of the clutch that is formed on the left end of collar 28. These two clutch members are held normally in engagement with each other by means of a spring 59 that bears with one end against a shoulder formed in the shaft 29 and with its other end against a flange 61 attached to the front end of the shaft 56.

For a description of the operation of the switch, reference is made to Figure 4 in which the parts are shown in a normal position. It must be understood that while a single-pole single-throw mercury switch such as would be used for on-off control is disclosed, that other types of switches, mercury or open contact, may be used. Reference is made to the copending application of Arthur H. Jordan, Serial No. 468,925, filed December 14, 1942, now Patent No. 2,435,281, dated February 3, 1948, which discloses various open contact switches that may be used in place of the mercury switch if desired. It may be assumed that when the temperature is at the desired control point, the parts are in the relative position disclosed in Figure 4. Further increase in the temperature being measured would produce a counter-clockwise rotation of the indicating dial as shown in Figure 1 or a clockwise rotation of the cam 53 as shown in Figure 4. This rotation of the cam will cause the notch 54 to move the roller 44, and the arm 43 carrying this roller, to the dotted-line position shown in Figure 4. Such a movement would not have any effect on the position of the switch since the switch suport 46 would remain in the position shown due to the action of spring 48. Separation of arm 43 from arm 47 will cause flexing of the spring 49. If, however, the temperature being measured should drop, cam 53 would rotate in a counter-clockwise direction in Figure 4. During this rotation the notch 54 will pick up the roller 44 and permit it to move in a clockwise direction from the dotted-line position until the parts reach the position shown in full lines in the drawing. Continued rotation of cam 53 will move roller 44 in a clockwise direction until it reaches the surface of the cam. By this movement the arm 43 will tilt the switch supporting member 46 against the action of the spring 48 and will move switch 52 clockwise so that the mercury will close the contacts therein. This closure may energize suitable relays to produce the desired control action to increase the temperature. Such a relay is shown at R where it serves to operate a switch S which closes circuit to a valve V actuated by a solenoid SO.

In order to have the instrument control the temperature to various values, it is necessary that notch 54 of the cam be moved to various positions relative to the position of the contact 5. This may be accomplished by moving shaft 56 to the left in Figure 3 relative to shaft 29 in order to separate the clutch members 57 and 58 and then rotating the shaft 56. This is accomplished by having a friction member 62 attached to the front end of flange 61 on the shaft 56. A complementary friction member 63 is attached to a shaft 64 whose other end has mounted upon it a knob 65. The shaft 64 is journaled in a suitable bearing 66 that is fastened in an opening formed in the door 19. Normally the friction members 62 and 63 are held separated and the knob is prevented form rattling by means of a spring 67 that is placed between the knob and the bearing 66. In order to adjust the control point of the instrument, the knob 65 is moved to the left in Figure 3 until the friction members 62 and 63 engage. Further movement will overcome the force of the spring 59 and separate the clutch members so that the cam may be rotated relative to the contact. In order that the control point of the instrument may be seen and may be accurately set, there is provided a pointer 68 that is attached to the disc 61 and which lies in front of the indicating dial 34. This pointer cooperates with a scale on the dial to indicate the value of the temperature at which the switch 52 will be operated.

It will be seen from Figure 1 of the drawing that the indicating dial 34 is provided with a large scale 71 that the pointers 37 and 68 cooperate with to indicate respectively the value of the temperature to which the thermocouple 4 is subjected and the value at which it is desired to maintain this temperature. The pointer 68 is provided with an extension 69 which is shorter than the pointer 68 and which extension cooperates with a small scale 72 that is also printed on dial 34. It will be seen that the characters on the small scale 72 are displaced 180° from the characters on the large scale 71. The reason for this is so that the value of the control point may be determined no matter what the temperature being measured happens to be. The window 36 formed in the door 19 extends slightly more than 180° while the scales 71 and 72 extend for approximately 320° around dial 34. When the controller is operating properly, the temperature should be at a control point so that the two pointers 37 and 68 are in a line. For example, in the illustration of Figure 1, the temperature is indicated as being at 6.3 and this is also the control point since that is the point on scale 71 to which the pointer 68 is adjusted. Suppose, however, a furnace under control is just being started up. In this condition the zero mark on the scale 71 would be under pointer 37 and unless some other means than the pointer 68 were provided, it would be impossible to tell where the control point of the instrument was set. Since, however, the pointer 69 is displaced 180° from pointer 68 and the scale 72 is displaced 180° from the scale 71, an observer will be able to see the control point of the instrument no matter what the position of the dial, since, if the temperature indicated by scale 71 is zero, the small end of pointer 69 will be visible through opening 36 as will the portion of scale 72 with which it cooperates.

There is also provided on the front of the instrument a knob 73 by means of which the standardizing rheostat 3 and switch 9 may be adjusted and a knob 74 which operates a switch that can turn on or off the entire system. There is also provided a suitable knob 75, which may contain a lock, by means of which door 19 may be opened or closed.

In Figure 5 there is shown another embodiment of the invention. In this embodiment the case 18 also has supported in it the amplifier unit as well as the two batteries. The door 19 in this embodiment is fastened to the case by suitable screws, as shown in the drawing, rather than being hinged thereto as was the door in the previously described embodiment. The mechanism is, however, attached to the inside of the door in a manner similar to that previously described. In this embodiment there are provided studs 76 which project rearwardly from the door and to which is attached a supporting plate 77. This plate has fastened in it a rearwardly extending bearing 78 formed with a flange 79 to which is attached by any suitable means an insulating disc 81. The slidewire 1 is wrapped around this disc.

The arm 27 upon which the slidewire contact 5 is mounted is fastened to a collar 82 that is in turn mounted upon the rearwardly extending end of a tubular shaft 83. This shaft extends through the bearing 78 and projects from the front portion thereof where it has mounted on it a collar 84. Rotation is imparted to shaft 83 and the slidewire contact by a drive gear 85 which is attached to collar 84. Gear 85 is in mesh with the pinion 32 on the shaft of motor 8. The collar 84 also has on it a flange 86 to which is attached a suitable indicating dial 87 that in this case is dished as shown in the drawing and for a purpose which will be described below. It is noted that this dial will have only one scale on it.

In this embodiment the control switch 52 and its support 51 are mounted on a yoke 88 that is pivotally mounted upon a sleeve 90 which is fastened in the supporting plate 77. The yoke has formed as a portion thereof an arm 89 which engages one end of a lever 92 that is mounted upon shaft 91 which is journaled in the sleeve 90. The lower end of arm 92 has a pin projecting from it and rotatably mounted on the pin is a roller 93 which engages the switch actuating cam. There is provided a spring 94 which normally biases the switch supporting yoke 88 to a fixed position against a portion of the plate 77 whereby the switch will be held in a horizontal position similar to the position in which it was held in the embodiment of Figure 1. There is also provided a spring 95 which serves to hold the upper end of the lever 92 against the portion 89 of yoke 88.

Arm 92 is moved to throw the switch by means of a cam 96 that is mounted on a second collar 97 which is journaled on the collar 84. This collar 97 also carries a gear 98 by means of which the cam may be rotated relative to the shaft 83 carrying the slidewire contact, in order to adjust the control point of the instrument. Normally, however, the collars 97 and 84 are held in a fixed position relative to each other by means of a friction spring 99 which extends between the cam 96 and the gear 85. Gear 98 is rotated to adjust the control point of the instrument by a pinion 101 which is formed with a sleeve 102 and which is journaled for rotation on a shaft 103 that is in turn rotatable in openings formed in door 19 and supporting plate 77. The shaft 103 has mounted on it a disc 104 to the right side of which is attached a washer 105 of friction material. Also on shaft 103 is a knob 106 by which this shaft may be moved axially and rotated. Normally the shaft is held in the axial position shown with washer 105 separated from pinion 101 by a spring 107 that is fastened to the rear face of the supporting plate 77.

In order to adjust the control point in this embodiment of the instrument, the knob 106 is moved to the left in Figure 5 until the friction washer 105 bears against the face of pinion 101. Thereafter knob 106 is rotated to rotate this pinion and the gear 98 in mesh therewith. Such rotative movement produces relative rotation between the sleeves 97 and 84 so that the cam 96 may be rotated relative to the contact 5 and thereby adjust the control point of the instrument. In order to prevent rotation of the gear 85 and driving pinion 32 when the control point of the instrument is being adjusted, there is provided a brake member 108 that is mounted on a stud 109 fastened to the lower portion of the plate 77. This brake member is held normally in the position shown by a spring 111 but may be moved to the left into engagement with the pinion by a disc 112 which is attached to the pinion 101.

In this embodiment of the invention the door 19 is provided with a circular opening in which is inserted a bezel 113 that has a window 114 mounted in it. The window is of such a size that the entire disc 87 is visible. There is provided an index member 115 which is attached to the door 19 that cooperates with the disc 87 in order to indicate the value of the temperature being measured. In order to indicate the control point for which the instrument has been adjusted, there is provided a pointer 116 which is attached to the gear 98 and which extends forwardly and upwardly so that the pointer lies in front of the edge of the disc 87. Normally, of course, gear 98 rotates with the disc, so that those parts retain their adjusted position relative to each other, and since the window 114 is circular, the pointer 116 may be seen at all positions of the disc 87.

In this embodiment of the invention illumination for the disc 87 is provided by means of a bulb 117. This bulb is mounted in a socket 118 that is fastened to the interior of the shaft 83. Since the disc 87 is dished, the entire surface of this disc will be illuminated and may, therefore, more readily be seen. To prevent glare in the eyes of an observer, there is provided a coating 119 of some suitable material on the back of the window 114. This material preferably will be such that it can reflect light from the bulb back to the disc. Since socket 118 is attached to shaft 83, the cable 121 carrying current to the bulb will be twisted slightly as the disc is rotated. This twisting, however, will not be objectionable since the disc 87 is only being rotated approximately 320° through its full range of movement.

From the above description, it will be seen that I have provided a compact, self-balancing potentiometer which has a simple and accurate control mechanism attached to it. The means illustrated herein for adjusting the control point of the condition and for indicating the value of the condition, as well as the value of the control point, is both simple and effective.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In a measuring and control instrument, a support having a bearing therein, a slidewire mounted on said support, control means mounted on said support, a hollow shaft journaled in said bearing and extending beyond both ends of the same, a contact engaging said slidewire carried by one end of said hollow shaft, drive means carried by the opposite end of said hollow shaft whereby said hollow shaft may be rotated to move said contact along said slidewire, a second shaft journaled for rotation in said hollow shaft, means to operate said control means mounted on said second shaft, mechanism operative to keep normally said shafts from rotating relative to each other, and means to relatively rotate said second shaft and said hollow shaft whereby said operating means may be adjusted relative to said contact.

2. In a measuring and control instrument, a support having a bearing therein, a circular slidewire fixed relative to said support, control means fixed relative to said support, a contact engaging said slidewire; a hollow shaft journaled for rotation in said bearing, means to mount said contact on said hollow shaft so that as said shaft is rotated said contact will be moved along said slidewire, means to rotate said hollow shaft to positions dependent upon the value of a variable condition, a second shaft journaled for rotation in said hollow shaft, means to operate said control means carried by said second shaft, a clutch comprising a part on each of said shafts; resilient means operative to maintain normally said clutch parts in engagement with each other, and means to separate said clutch parts and rotate said second shaft relative to said hollow shaft whereby said means to operate said control means may be adjusted relative to said contact.

3. In a measuring and control instrument, a support having a bearing therein, a circular slidewire fixed relative to said support, control means fixed relative to said support, a contact engaging said slidewire, a hollow shaft rotatably mounted in said bearing, means to mount said contact on said hollow shaft to be rotated therewith, means to rotate said hollow shaft to positions depending upon the value of a variable condition, an indicating dial carried by said shaft to indicate by its position the value of the condition, a second shaft mounted coaxially of said hollow shaft, means to operate said control means carried by said second shaft, clutch means having a part on each of said shafts, means to keep normally said parts in engagement whereby said shafts will rotate together, means to separate the parts of said clutch and rotate said second shaft relative to said hollow shaft, and means carried by said second shaft and cooperating with said indicating dial to exhibit the relation of said means to operate said control means and said contact.

4. In a measuring and control instrument, a casing, a door for said casing, a circular slidewire mounted in fixed relation to said door, a first shaft journaled for rotation relative to said door, a contact carried by said first shaft and engaging said slidewire to be moved therealong, control means fixed relative to said door, a second shaft coaxial with said first shaft, means to actuate said control means carried by said second shaft, a clutch having a part thereof on each shaft, means to keep normally said clutch parts in engagement with each other, a third shaft slidably and rotatably mounted in said door coaxial with said first two shafts, and means to move said third shaft into engagement with one of said first two shafts to separate said clutch parts and rotate one of said first two shafts relative to the other.

5. In a measuring and control instrument, an instrument casing having a door thereon, instrument mechanism mounted on said door and protected by said casing including a hollow shaft journaled for rotation on said door, a circular slidewire and a cooperating contact, one of said slidewire and contact being carried by said door and the other by said hollow shaft whereby rotation of said shaft will move them relative to each other, means mounted on said door to rotate said hollow shaft to a position corresponding to the value of a variable condition, control means mounted on said door, a second shaft concentric with said hollow shaft, means to operate said control means carried by said second shaft, clutch means having a part thereof on each of said shafts, means to hold normally the parts of said clutch means in engagement with each other, means mounted in said door coaxial with said shafts to separate said clutch parts and rotate one of said shafts relative to the other, and means to indicate the relative position of said shafts.

6. In a measuring and control instrument, a support, a circular slidewire mounted on said support, a contact to engage said slidewire, a hollow shaft journaled in said support, means to mount said contact on said shaft for rotation therewith, control means mounted on said support, a second shaft journaled in said hollow shaft, means to operate said control means carried by said second shaft, a clutch having a part thereof on each of said shafts, said clutch being engaged or disengaged by axial movement of said second shaft, means to keep normally said clutch engaged, clutch operating means mounted coaxial with said shafts, and means by which said clutch operating means may be operated to shift said second shaft axially and to rotate the same.

7. In a measuring instrument, a casing, a window in said casing and being generally semi-circular in shape, an indicating dial back of said window, said dial being circular, means to rotate said dial to positions proportional to the value of a condition being measured, a pair of concentric circular scales on said dial, said scales being displaced 180° from each other, a member attached to said casing and cooperating with the outer of said scales to indicate the value of a condition, a pointer concentric with said dial and movable therewith, said pointer having a portion cooperating with said outer scale to indicate the desired value of the condition, and another portion cooperating with the corresponding portion of the inner of said concentric scales whereby the desired value of the condition may be indicated through said window to an observer no matter what the value of the condition may be.

8. In a measuring and control instrument, a casing having an open front, a door to close the open front of said casing, a support on said door, a bearing projecting from said support, a circular slidewire mounted on said bearing, a contact to engage said slidewire, a shaft journaled in said bearing, means to attach said contact to said shaft for rotation therewith, motor means to rotate said shaft and thereby move said contact along said slidewire to a position proportional to the value of a condition, control means mounted on said support, a cam to operate said control means, means to mount said cam on said shaft for rotation relative thereto, means to keep normally said cam from rotating relative to said shaft, means to rotate said cam on said shaft to change its position relative to said contact and thereby adjust the control point of said instrument, and brake means operated by said last mentioned means to prevent said shaft from rotating as said cam is being adjusted.

9. In a compact, self-balancing potentiometer type control instrument, including: a casing having a movable cover; a potentiometer network including a slidewire mounted on said cover, a contact mounted on said cover and engaging said slidewire, and a plurality of resistances mounted on said cover; a motor mounted on said cover and energized for rotation in one direction or an opposite direction towards the position in which said contact balances said potentiometer network, said movement depending upon unbalance of said potentiometer network; a shaft rotated by said motor to move said contact along said slidewire; an arm between said shaft and said contact; a condition-responsive element located outside of said casing and connected to said potentiometer network; an electric switch for connecting a condition-adjusting mechanism to a source of electric power for operation and for disconnecting said mechanism from said source of power; the combination including: a scale having a plurality of markings on it and driven by said shaft so as to be moved as said shaft rotates; a stationary index cooperating with the markings on said scale to indicate that value of the condition to which said condition-responsive element is responding; a cam for actuating said electric switch to open or to closed position; a normally engaged clutch forming part of the driving connection between said shaft and said cam; a pointer movable relative to said scale to indicate the value of the condition at which said cam is set to actuate said electric switch and movable by said shaft when said shaft moves said scale so that said pointer retains the position relative to said scale to which it has been set; a normally disengaged clutch for moving said pointer and said cam while said scale remains stationary to adjust the position at which the cam is set to actuate said electric switch and to adjust the indication of the set point given by said pointer relative to said scale; and a manually operable handle extending outside of said casing and operable to disengage said normally engaged clutch to permit said contact and said scale to remain stationary and simultaneously to engage said normally disengaged clutch to adjust said pointer to indicate the value of the condition at which value said cam is set to actuate said switch and to adjust said cam relative to said switch.

10. In a potentiometer type control instrument, including, a casing including a cover for said instrument, a balanceable potentiometer network including, a slide wire, a contact movable over said slide wire, a cell to impress a potential on said slide wire, said parts being enclosed in said casing; a condition-responsive means connected to said network and located outside of said casing; a shaft connected to relatively move said slide wire and contact; motor means operating upon unbalance of said network to rotate said shaft to relatively move said slide wire and contact to rebalance said network; control means for the condition to which said condition-responsive means is responsive; the combination including: a scale mounted on said shaft so as to be driven thereby, a stationary index cooperating with said scale to indicate the present value of said condition, an actuator for driving said control means from one operative position to another, a set point indicator connected to said actuator for indicating the value of the condition at which said actuator drives said control means, a normally engaged clutch forming part of the driving connection between said shaft and said actuator, a handle rotatably and slidably mounted in said cover and extending outside of said cover and operable to disengage said clutch and to engage said actuator and said set point indicating means while said scale remains at rest, and a brake member movable by said handle to hold said contact and said scale stationary during the movement of said handle to adjust said indicator and said actuator.

11. In a measuring instrument having a plurality of component parts including, a control element for controlling the magnitude of a condition, a slide wire, a contact moving in engagement with said slide wire, a cell to impress a potential upon said slide wire, a casing including a cover enclosing the various component parts, a motor means also in said casing and operable in response to network unbalance to move said contact relative to said slide wire to a position in which said network in rebalanced: the combination including, a shaft driven by said motor, a scale driven by said shaft, a stationary index cooperating with said scale to indicate the value of the condition at which said network is balanced, normally engaged disengagable driving means driven by said shaft, an actuator for moving said control element from one position to another, an indicator connected to said actuator and cooperating with said scale to indicate the value of the condition to which said actuator drives said control element, a handle located in said cover and operable from the exterior thereof to disengage said driving means, whereby said actuator and said indicator may be adjusted without disturbing movement of said scale, and a normally engaged slipping journal, said actuator and said indicator having said slipping journal in the connection between them and said contact and said scale, whereby said handle can move said indicator and said actuator while said contact and said scale remain stationary.

12. In a measuring instrument, a support, a shaft rotatably mounted on said support, a motor operating said shaft in response to a variable which is to be measured, a scale on said shaft, a stationary index cooperating with said scale to indicate the instantaneous value of a variable, an electric switch for connecting a variable-adjusting mechanism to a source of electric power for operation and for disconnecting said mechanism from said source of power, a cam for actuating said electric switch to open or closed position, a pointer connected to said cam to indicate the value of the variable at which said cam is set to actuate said electric switch and movable by said shaft when said shaft moves said scale so that said pointer retains the position relative to said scale to which it has been set, and a manually operable handle extending through said support and operable to adjust said pointer relative to said scale and to adjust said cam relative to said switch.

13. In a self-balancing measuring instrument having a condition-responsive element: a casing having a movable cover; a potentiometer network including, a slide wire, a contact engaging said slide wire, and an electrolytic cell supplying a potential to said slide wire, a plurality of resistances, and a motor responsive to unbalance in said network and movable to move said contact relative to said slide wire to a position in which said network is rebalanced; said condition-responsive element being located outside of said casing and connected to said potentiometer network; an electric switch for connecting a condition-adjusting mechanism to a source of electric power for operation and for disconnecting said mechanism from said source of power, a scale having a plurality of markings on it and driven by said motor, a stationary index designating that marking on said scale which indicates the value of the condition to which said condition-responsive element is responding; a cam for actuating said electric switch to open or closed position; a pointer connected to said cam and movable relative to said scale to indicate the value of the condition at which value said cam is set to actuate said electric switch, a normally engaged clutch operatively interposed between said motor and said cam and said pointer, and a manually operable handle extending outside of said casing and operable to disengage said normally engaged clutch to allow said contact and scale to remain stationary while said handle adjusts the position at which the cam is set to actuate said electric switch and adjusts the indication of the set point given by said pointer relative to said scale.

14. A control instrument for automatically effecting a control action on a primary condition and having, a measuring instrument responsive to the value of said condition and a final control element for controlling said condition: and including, a motor operable in response to the measurements of said instrument, a scale movable by said motor, a stationary index for designating a marking on said scale which indicates the present value of the condition, a cam engaging said final control element to actuate it to one of two operative positions, an indicator connected to said cam and cooperating with said scale to indicate on said scale the value of the condition at which value said cam is set to actuate said final control element, a normally engaged clutch forming a connection between said motor and said cam so that said motor normally drives said scale and said cam and said indicator, and a handle forming an operating element for said clutch and removable to disengage said clutch to adjust said cam and said indicator relative to said final control element and to said scale while said final control element and said scale remain stationary.

15. A measuring and control instrument including, a balanceable electrical network having a plurality of parts including, a slide wire, a contact moving in engagement with said slide wire, an electrolytic cell for supplying a potential to said slide wire, a casing including a cover enclosing the various component parts, a motor also in said casing and operable in response to network unbalance to move said contact relative to said slide wire to a position in which said network is rebalanced, a scale connected to said contact and driven by said motor, a stationary index cooperating with said scale to indicate the value at which said network is balanced, an electric switch driven by said motor for connecting a condition-adjusting mechanism to a source of power for operation and for disconnecting said mechanism from said source of power, a normally engaged clutch having a driving member driven by said motor and a driven member, said scale and said contact being carried by the driving member, a cam for actuating said electric switch to open or closed position, a pointer for indicating relative to said scale the value of the condition at which said cam moves said switch, said cam and said pointer being mounted on the driven member, and a handle located in the cover and operable from the exterior thereof to disengage said clutch whereby said cam may be adjusted relative to said switch and said pointer may be adjusted relative to said scale while said scale and said switch remain stationary.

16. A measuring, indicating and controlling instrument having a measuring element responsive to a variable which is to be controlled and a final control element for controlling said variable and operable by said measuring element from one operative position to another at a set-point corresponding to a value of said variable and including, a scale movable in response to actuation of said measuring element, a stationary index for indicating a marking on said scale which designates the value of the variable at that instant, a set-point indicator movable by said measuring element together with said scale and indicating by reference to said scale the value of the variable corresponding to said set-point, and a manually operable handle for engaging said set-point indicator and having a disengageable connection with said scale so that said handle may adjust said set-point indicator without moving said scale.

17. A control instrument for automatically effecting a control action on a primary condition having a measuring element responsive to the value of said condition and a final control element for controlling said condition and movable in response to the measurements of said measuring element to one or another operative position, and including, a scale movable in response to the measurements of said element, a stationary index designating a marking on said scale indicating the present value of the condition, an indicator movable by said measuring element and cooperating with said scale to indicate on said scale the value of the condition to which value said element actuates said final control element, a clutch forming part of the drive between said measuring element and said final control element so that said measuring element normally drives said scale and said indicator, a handle movable to adjust said indicator relative to said final control element and to said scale while said measuring element and said scale remain stationary due to action of said clutch so as to adjust the value of the condition at which said measuring element actuates said final control element, and a source of light illuminating said index and said scale and said indicator.

18. In a measuring and indicating controller having a variable-measuring element and having a variable-controlling element controlling said variable and operable by said measuring element from one operative position to another, the combination of: a box-like casing having an open front, a flat door movably secured to and closing the front of said casing and having a window in it, a scale movable in said casing in response to movements of said measuring element and having at least a portion visible through said window, a stationary index aligned with said window and cooperating with a portion of said scale to indicate the value of the variable measured by said measuring element at that instant, an indicator movable by said measuring element along with said scale and cooperating with said scale to indicate the value of the variable at which value said measuring element operates said controlling element, a clutch forming part of the driving connection between said elements, and a manually operable handle moving said indicator by means of the relative movement of said clutch while said scale and said measuring element remain stationary.

19. In an instrument for controlling a variable in response to deviations of said variable from a selected value and having an element measuring the variations of said variable from said selected value, and having a device for maintaining said variable at said selected value and connected so as to be operated by said element, the combination including: a casing having solid walls forming a deeply recessed cavity with one open side, a door mounted on said casing for relative movement therebetween and normally closing said open side, a portion of said door being transparent, a scale mounted on said door and driven by the movements of said element past said transparent portion, an index mounted adjacent said scale so as to cooperate with said scale so as to indicate the present value of the variable as measured by said element, an indicator mounted on said door and movable by said measuring element in conjunction with said scale and having a portion cooperating with said scale so that the reading of said indicator against said scale does not vary during the joint movement of said scale and said indicator, a normally engaged clutch mounted on said door and forming part of the driving connection between said element and said device, and a hand knob mounted for engagement with said clutch to disengage said clutch and to turn said indicator relative to said scale and to vary the value of the variable at which said element operates said device while said scale and said element remain stationary.

20. A control instrument for automatically effecting a control action on a variable and for indicating the present value of said variable and the value of said variable at which said control action is taken and having a measuring element responsive to said variable and having a final control device for controlling said variable and operable by said measuring element at a selected value of said variable, the combination including: a casing having a flat wall and sides projecting from said flat wall and encircling a front opening, a door mounted on said casing for relative movement therebetween and normally closing said front opening, a transparent window forming a portion of said door, a scale mounted on said door and movable past said window under the drive of said measuring element, a stationary index visible adjacent said window and cooperating with said scale to indicate on said scale the value of the variable measured at that moment, normally engaged relatively movable driving and driven elements forming part of the driving connection between said measuring element and said final control device, an indicator connected to said driven element and having a portion cooperating with said scale and visible through said window to indicate by reference to said scale the value of the variable at which said measuring element operates said control device, and a manually operable handle mounted on and projecting through said door and convenient to the hand of an operator looking through said window, said handle being operable to disengage said means and to turn said indicator while said measuring element and said scale remain stationary.

21. In a measuring and control instrument, a casing having a flat wall and sides projecting from said flat wall and encircling a front opening, a door mounted on said casing for relative movement therebetween and normally closing said front opening, a transparent window forming a portion of said door, a support mounted on the inner side of said door, potentiometer mechanism including a slide wire, a contact, a driving motor, and a scale plate mounted on said support, said scale plate being movable past said window under the drive of said potentiometer mechanism, a stationary index visible adjacent said window and cooperating with said scale to indicate the value of the variable measured at the moment, control mechanism mounted on said support and operated by said potentiometer mechanism, control point adjusting means for said control mechanism, and a manually operable handle attached to and extending through said door to adjust the control point of said mechanism from the outside of said door.

22. In an instrument as defined in claim 21, the combination wherein said control mechanism includes a bearing projecting from said support, a hollow shaft journalled in said bearing, illuminating means for said scale plate carried in the bore of said hollow shaft, and an opaque reflector mounted on said window and located opopsite said illuminating means so as to shield it from the direct view of an observer.

ANTHONY A. NINA.

REFERENCES CITED

The following references are of record in the file of this patent:

UNITED STATES PATENTS

| Number | Name | Date |
|---|---|---|
| 1,907,093 | Shivers | May 2, 1933 |
| 1,931,223 | Harrison | Oct. 17, 1933 |
| 1,942,343 | Melik-Minassiantz | Jan. 2, 1934 |
| 2,096,064 | Ross et al. | Oct. 19, 1937 |
| 2,112,704 | Mackay | Mar. 29, 1938 |
| 2,152,635 | Crane et al. | Apr. 4, 1939 |
| 2,158,468 | McCleary | May 16, 1939 |
| 2,277,365 | Michael | Mar. 24, 1942 |
| 2,288,679 | Caldwell | July 7, 1942 |
| 2,368,912 | Barnes | Feb. 6, 1945 |
| 2,406,341 | Beach et al. | Aug. 27, 1946 |

FOREIGN PATENTS

| Number | Country | Date |
|---|---|---|
| 12,416 | Great Britain | Sept. 20, 1906 |
| 569,873 | Germany | Feb. 9, 1933 |

OTHER REFERENCES

Handbook of Industrial Temperature and Humidity Measurement and Control, Behar, 1st ed., Instruments Publishing Company, Pittsburgh, 1932, pp. 231, 232, and 372.